US008674058B2

(12) United States Patent
Nawa et al.

(10) Patent No.: US 8,674,058 B2
(45) Date of Patent: Mar. 18, 2014

(54) DURABILITY IMPROVING AGENT AND CEMENT COMPOSITION

(75) Inventors: Toyoharu Nawa, Sapporo (JP); Hironobu Nishi, Ibaraki (JP); Susumu Hashizume, Ibaraki (JP); Kazutoshi Toda, Tokyo (JP); Jun Kakutou, Iwakura (JP); Hiroshi Ohshima, Iwakura (JP); Syou Suzuki, Iwakura (JP)

(73) Assignees: National University Corporation Hokkaido University, Sapporo-shi (JP); Flowric Co., Ltd., Tokyo (JP); Miyoshi Oil & Fat Co., Ltd., Tokyo (JP)

( * ) Notice: Subject to any disclaimer, the term of this patent is extended or adjusted under 35 U.S.C. 154(b) by 0 days.

(21) Appl. No.: 13/121,846

(22) PCT Filed: May 13, 2010

(86) PCT No.: PCT/JP2010/058106
§ 371 (c)(1),
(2), (4) Date: Jul. 22, 2011

(87) PCT Pub. No.: WO2010/131707
PCT Pub. Date: Nov. 18, 2010

(65) Prior Publication Data
US 2012/0097075 A1   Apr. 26, 2012

(30) Foreign Application Priority Data

May 15, 2009   (JP) .................................. 2009-119070

(51) Int. Cl.
*C08G 61/02*   (2006.01)
*C08G 61/04*   (2006.01)
*C08G 61/00*   (2006.01)
*C08G 65/34*   (2006.01)

(52) U.S. Cl.
USPC ......................................... 528/396; 528/425

(58) Field of Classification Search
USPC .................................................. 528/396, 425
See application file for complete search history.

(56) References Cited

U.S. PATENT DOCUMENTS 7,026,442 B2 * 4/2006 Nagare .................... 528/502 R

FOREIGN PATENT DOCUMENTS

| EP | 0242646 | * | 10/1987 |
| EP | 0350904 | * | 1/1990 |
| JP | 1 138163 | | 5/1989 |
| JP | 2-124750 A | | 5/1990 |
| JP | 6 158047 | | 6/1994 |
| JP | 6 219804 | | 8/1994 |
| JP | 6 279080 | | 10/1994 |
| JP | 7 109154 | | 4/1995 |
| JP | 8-26798 A | | 1/1996 |
| JP | 2000-95551 A | | 4/2000 |
| JP | 2001-163653 A | | 6/2001 |
| JP | 2006 193416 | | 7/2006 |

OTHER PUBLICATIONS

International Search Report issued Jun. 8, 2010 in PCT/JP10/058106 filed May 13, 2010.
Hironobu Nishi, et al., "Effects of shrinkage reducing admixture on drying shrinkage and freeze-thaw behavior of mortar", Concrete Annual Journal, vol. 29, No. 1, Jul. 2007, pp. 1173-1178 with partial English translation.
"Concrete Admixture Materials and the Current State of the Techniques Relating to the Standardization of the Cement", Documentation from a symposium held by the Architectural Institute of Japan concerning the standardization of concrete materials, Proceedings of Cement, Concrete Admixture Materials, and a Collection of Papers Thereof, Sep. 2006, p. 82 with cover page and partial English translation.

* cited by examiner

*Primary Examiner* — Duc Truong
(74) *Attorney, Agent, or Firm* — Oblon, Spivak, McClelland, Maier & Neustadt, L.L.P.

(57) ABSTRACT

It is an object of the present invention to provide a durability improving agent for a cement composition that improves the freezing-thawing resistance of the cement composition and also exhibits a sufficient shrinkage reducing performance as well, and a cement composition including such a durability improving agent. Specifically, the present invention provides a durability improving agent for a cement composition, characterized by comprising a hydrocarbon-based compound having an average molecular weight of 150 to 600 and a pour point of 20° C. or less as an active ingredient, and a cement composition including such durability improving agent.

20 Claims, No Drawings

DURABILITY IMPROVING AGENT AND CEMENT COMPOSITION

This application is a National Stage of PCT/JP10/058106 filed May 13, 2010 and claims the benefit of JP 2009-119070 filed May 15, 2009.

TECHNICAL FIELD

The present invention relates to a durability improving agent and a cement composition. More specifically, the present invention relates to a durability improving agent, for a cement composition, that causes no deterioration in freezing-thawing resistance (frost damage resistance), forms a good cement composition, and can substantially suppress drying shrinkage, and relates to a cement composition containing such a durability improving agent.

BACKGROUND ART

The freezing-thawing resistance of a cement composition is, along with a shrinkage reducing effect, one of the important factors in the durability of a cement composition. Having freezing-thawing resistance is, especially in cold regions, an essential requirement for cement compositions. As a technique for improving freezing-thawing resistance, a frost damage resistant cement admixture material characterized by containing an AE agent having a high-range water reducing agent and a natural resinate as main components has been reported (Japanese Patent Application Laid-Open No. 2000-95551 (Patent document 1)). However, the effect provided by this admixture on freezing-thawing resistance is insufficient. Moreover, if a shrinkage reducing agent expected to give a shrinkage reducing effect is added to a cement composition additionally with this admixture, it has caused the trouble that the freezing-thawing resistance of the cement composition is dramatically harmed. Conventionally, the only way to ensure freezing-thawing resistance has been to increase the strength of the cement composition or carry out measures during the curing process after the cement composition has been produced, and even the resultant effects were insufficient. Therefore, there is an expectation of developing a new durability improving agent which simply improves freezing-thawing resistance.

The entrainment of fine air bubbles in a cement hydrate is very effective in improving freezing-thawing resistance. Consequently, it is common to add an air entraining component to a cement composition. However, for the following reasons, this cannot always be a means that prevents frost damage.

A first reason that frost damage cannot be prevented by the addition of an air entraining component is that, although defoaming occurs while the cement hydrate is hardening, the air entraining component is added before the hardening of the cement hydrate, and consequently, after hardening, in some cases the air bubbles cannot be sufficiently entrained after the hardening.

A second reason that frost damage cannot be prevented by the addition of an air entraining component is that since ice nuclei are necessary to form ice in the cement hydrate, the contribution of the air content in the cement hydrate in suppressing frost damage may possibly not be very much. The formation of ice may also be said to be a random, haphazard phenomenon.

A third reason that frost damage cannot be prevented by the addition of an air entraining component is that the incidence of frost damage differs greatly depending on the materials used in the cement composition. For example, when using an aggregate having a large percentage of total moisture content, an aggregate having a low strength, or a cement with slow strength development as the cement hydrate materials, the cement composition is susceptible to frost damage due to the large amount of frozen water in the cement hydrate and the fact that the composition lacks the strength to withstand freeze expansion.

A fourth reason that frost damage cannot be prevented by the addition of an air entraining component is that the concentration of specific components included in the cement hydrate increases when the cement hydrate freezes, which has a collateral effect of accelerating deterioration. Reported examples of such components include chlorine ions and hydrogen ions. An increased concentration of chlorine ions induces supercooling due to the increased mole concentration, causing ice lenses to be produced in the cement hydrate. An increased concentration of hydrogen ions is a factor in alkali-aggregate reactions.

A fifth reason that frost damage cannot be prevented by the addition of an air entraining component is that the pore structure in the cement hydrate affects frost damage. The freezing of a cement composition proceeds in a manner that is dependent on pore diameter. Specifically, the moisture in coarser pores is less susceptible to supercooling, so that freezing occurs at a higher temperature. Even when there is high continuity of the pores in the cement hydrate, the amount of frozen water increases due to the continuous ice trapping non-frozen water, whereby frost damage is manifested. Thus, since there are various causes of frost damage, an improvement will not necessarily be achieved merely by introducing air into the cement composition.

In addition, even when air is entrained by adding an air entraining agent to the cement composition, if a shrinkage reducing agent that is not attached to the cement particles is also used, the shrinkage reducing agent causes the diameter of the entrained air bubbles to expand. As a result, the diameter of air bubble and the air-void spacing factor increase, so that the freezing-thawing resistance dramatically deteriorates. Generally, if the air-void spacing factor is 250 µm or less, freezing-thawing resistance is said to be excellent. However, it has been reported that even when the air-void spacing factor is 250 µm or less, if a shrinkage reducing agent that is not attached to the cement particles is included in the moisture in the pores in the cement composition, the freezing-thawing resistance of the cement composition is dramatically harmed (Concrete Annual Journal, July 2007, Vol. 30, 1188 (refer to Non-Patent document 1)).

On the other hand, typically a shrinkage reducing agent for a cement composition (hereinafter, sometimes referred to as "shrinkage reducing agent") is used for the purpose of reducing the amount of drying shrinkage, which has an adverse effect on the durability of the obtained cement composition. Shrinkage reducing agents may be compounds that maintain water solubility (Japanese Patent Application Laid-Open No. 2001-163653 (Patent document 2)), or compounds that are water-insoluble (for example, refer to Japanese Patent Application Laid-Open No. Hei 2-124750 (Patent document 3)).

However, although the shrinkage suppression amount of the cement composition increases with an increase in the added amount for either of these shrinkage reducing agents, there has been the problem that the freezing-thawing resistance of the cement composition is caused to dramatically deteriorate. The only way to avoid this problem and maintain freezing-thawing resistance is to decrease the added amount of the shrinkage reducing agent, which makes it impossible to ensure the desired effect of shrinkage reducing in the cement composition. It has been reported that frost damage resistance (freezing-thawing resistance) of a cement composition added a shrinkage reducing agent dramatically deteriorates even if the added amount of the shrinkage reducing agent is small (documentation from a symposium held by the Architectural Institute of Japan concerning the standardization of concrete materials, Proceedings of Cement/Concrete Admixture Materials and the Current State of the Techniques Relating to the Standardization of the Cement/Concrete Admixture Materials, and a Collection of Papers Thereof, September 2006, p. 82 (refer to Non-Patent document 2)). Therefore, the limit of the shrinkage suppression amount of a conventional shrinkage reducing agent has been thought to be typically a shrinkage suppression ratio of about 15 to 20%.

Thus, in cold regions, it is especially difficult to apply a shrinkage reducing agent as a shrinkage suppression measure for a cement composition. The only way to maintain freezing-thawing resistance is to decrease the added ratio of the shrinkage reducing agent. As a result, a cement composition is unable to achieve a sufficient shrinkage reducing effect, which causes cracking under a constraint condition of a structure and the like. Further, it is difficult to ensure the durability of such a cement composition. In addition, it is known that cement compositions having a crack formed therein suffer from accelerated frost damage deterioration.

Meanwhile, there is a technique for preventing the occurrence of algae and seaweed and for improving seawater resistance, sulfate resistance, acid resistance and the like by adding an aliphatic-based hydrocarbon that is a solid at ordinary temperature to a cement composition (refer to Japanese Patent Application Laid-Open No. Hei 8-26798 (Patent document 4)). However, this technique suffers from the problem that the fluidity and the strength of the cement composition dramatically deteriorate along with an increase in the mixed amount.

Almost no example has been reported with respect to using oils and fats, which are hydrophobic compounds, as a cement composition additive. The reason for this is mainly because oils and fats degrade in an alkali environment, and thus have an adverse effect in the cement composition, such as preventing complete hardening. Another reason is that vegetable oils and animal oils are recognized as substances which corrode concrete. Further, supposing that an oil or fat is added to a cement composition, since the oil or fat has a smaller density than the materials normally used in the cement composition, the oil or fat would be expected to precipitate on the surface of the cement composition due to precipitation separation.

PRIOR ART DOCUMENTS

Patent Documents

Patent document 1: Japanese Patent Application Laid-Open No. 2000-95551
Patent document 2: Japanese Patent Application Laid-Open No. 2001-163653
Patent document 3: Japanese Patent Application Laid-Open No. 2-124750
Patent document 4: Japanese Patent Application Laid-Open No. 8-26798

Non-Patent Documents

Non-Patent document 1: Concrete Annual Journal, July 2007, Vol. 30, 1188
Non-Patent document 2: Documentation from a symposium held by the Architectural Institute of Japan concerning the standardization of concrete materials, Proceedings of Cement/Concrete Admixture Materials and the Current State of the Techniques Relating to the Standardization of the Cement/Concrete Admixture Materials, and a Collection of Papers Thereof, September 2006, p. 82

DISCLOSURE OF THE INVENTION

Problem to be Solved by the Invention

It is an object of the present invention to provide a durability improving agent for a cement composition that improves the freezing-thawing resistance of the cement composition and also exhibits a sufficient shrinkage reducing performance and a substance blocking property as well, and a cement composition including such a durability improving agent.

Means for Solving the Problem

As a result of diligent research, the present inventors focused on the following hydrocarbon-based compound having an average molecular weight of 150 to 600 and a pour point of 20° C. or less. As described above, although liquid hydrocarbon-based compounds have not been known conventionally to improve durability when added to cement, surprisingly, the present inventors confirmed that adding the above hydrocarbon-based compound to a cement composition not only improves the freezing-thawing resistance and the substance blocking property of the cement composition, but also sufficiently exhibits the desired shrinkage reducing effect. In addition, the present inventors discovered that if the hydrocarbon-based compound is added along with a compound of the general formula (I), the freezing-thawing resistance, the substance blocking property, and the shrinkage reducing effect are all remarkably improved. The present invention is based on such knowledge.

Specifically, the present invention provides the following invention.

(1) A durability improving agent for a cement composition, comprising a hydrocarbon-based compound having an average molecular weight of 150 to 600 and a pour point of 20° C. or less as an active ingredient.
(2) The durability improving agent for a cement composition according to claim 1, further comprising a compound of the following general formula (I):

R—O-(AO)$_n$—H     (I)

wherein R represents hydrogen or a hydrocarbon group having 1 to 8 carbon atoms, AO represents an oxyalkylene group having 2 to 4 carbon atoms, and n denotes an integer of 1 or more to 20 or less, and wherein a ratio of the hydrocarbon-based compound and the compound of the general formula (I) is 5/95 to 99/1 by weight.
(3) A cement composition comprising the durability improving agent for a cement composition according to (1) or (2).
(4) The cement composition according to (3), wherein the durability improving agent for a cement composition has a content, based on a composition weight ratio of the cement composition, of 0.02 wt. % to 2 wt. %.

Effect of the Invention

By adding the durability improving agent for a cement composition of the present invention to a cement composition, the durability of the cement composition, specifically, the freezing-thawing resistance, the shrinkage reducing effect, and the substance blocking property, can be improved. Such effect can be exhibited without affecting the original durability of the cement composition. More specifically, if durability is originally good, the durability improving agent can maintain or improve the durability, or if durability is originally poor, the durability improving agent can remarkably improve the durability.

The durability improving agent for a cement composition of the present invention is effective in suppressing and preventing cracking in the cement composition. The durability improving agent is especially effective as a measure for suppressing cracking in cement compositions in cold regions, which conventionally has been difficult. Specifically, by adding the durability improving agent for a cement composition of the present invention to a cement composition, since shrinkage of the cement composition can be sufficiently suppressed and consequently, the freezing-thawing resistance can be improved, a reduction in the occurrence of cracks, which accelerate frost deterioration, can be expected.

In addition, the durability improving agent for a cement composition of the present invention can also sufficiently exhibit an effect as a shrinkage reducing agent. Conventional shrinkage reducing agents for a cement composition have had the drawback of affecting air entrainment properties. However, with the shrinkage reducing agent for a cement composition of the present invention, this problem is resolved, which allows good air bubbles to be easily entrained in the cement composition. Therefore, the durability improving agent for a cement composition of the present invention not only dramatically improves the freezing-thawing resistance of the cement composition, but also ensures good workability, and can improve durability in a well-balanced manner without affecting the unit water content of the cement composition.

Further, the hydrocarbon-based compound included in the durability improving agent for a cement composition of the present invention as an active ingredient can be present on the gas-liquid interface of the pore channels in the cement composition. Therefore, the inventive durability improving agent also plays a role in blocking external harmful substances, and thus can exhibit an action of improving the substance blocking property of the cement composition.

When added to concrete, the durability improving agent for a cement composition of the present invention can maintain a good freezing-thawing resistance regardless of the shrinkage suppression amount. Consequently, the problem with conventional shrinkage reducing agents that the added amount has to be kept small due to concerns about affecting freezing-thawing resistance is resolved. Therefore, the amount required to obtain the desired shrinkage reducing effect can be appropriately selected, and the degree of freedom in selecting the added amount is increased.

BEST MODE(S) FOR CARRYING OUT THE INVENTION

The expression "durability improving" in the present invention means conferring, improving, or increasing the durability of, or maintaining the excellent durability of, the substance to which the agent is added. Specifically, for example, the expression "durability improving" means, when adding to a cement composition, the conferral of freezing-thawing resistance, the conferral of an effect of reducing a shrinkage amount, or the conferral of a substance blocking property to the composition. Therefore, the term "durability improving agent for a cement composition" of the present invention is restated as "freezing-thawing resistance improving agent for a cement composition," "shrinkage reducing agent," or "substance blocking improving agent".

The term "freezing-thawing resistance" in the present invention is also referred to as "frost damage resistance." This term refers to the resistance against a phenomenon (frost damage) that leads to the deterioration and the destruction of a cement composition due to the repeated freezing and thawing of moisture present in the interior of the composition. The term "durability improving agent" in the present invention refers to an additive for a cement composition for improving or increasing the above-described freezing-thawing resistance, or maintaining excellent freezing-thawing resistance, or preventing a deterioration in the freezing-thawing resistance.

The term "substance blocking property" in the present invention refers to resistance against the phenomenon of a cement composition deteriorating due to the entry of a harmful substance from a cement composition surface. A representative harmful substance is carbon dioxide gas. Carbon dioxide gas enters from outside into a cement composition, which is alkaline, whereby the hydrogen ion index of the cement component decreases. This phenomenon is a factor in inducing generation of rust or corrosion of steel materials, such as rebar, in a cement composition. Further, the infiltration of chlorine ions also generates rust of steel materials, which leads to a deterioration due to the expansion of the steel materials. In addition, the infiltration of moisture causes the percentage of total moisture content in the cement composition to increase, which invites an increase in the amount of frozen water when the cement composition undergoes a freezing and thawing action.

The durability improving agent of the present invention can improve freezing-thawing resistance by being added to a cement composition. Further, the present durability improving agent reduces drying shrinkage, and can also reduce the hydration shrinkage and autogenous shrinkage that occur during a hydration reaction and a hardening process of a cement composition. Then, the present durability improving agent can exhibit an effect as a reducing agent for hydration shrinkage and autogenous shrinkage, as well as a substance blocking property.

The active ingredient in the durability improving agent for a cement composition of the present invention is a hydrocarbon-based compound having an average molecular weight of 150 to 600 and a pour point of 20° C. or less. The hydrocarbon-based compound is a compound having a paraffin, an olefin, an alkyne, a cycloparaffin, a cycloolefin, an aromatic and the like as a main component. Although the hydrocarbon-based compound is mainly formed from hydrocarbons, like a mineral oil, the hydrocarbon-based compound may also contain as an impurity a hetero compound that includes nitrogen, sulfur, oxygen and the like.

The hydrocarbon-based compound constituting the durability improving agent for a cement composition of the present invention has an average molecular weight of 150 to 600 and a pour point of 20° C. or less. Examples of such a hydrocarbon-based compound include various distillates obtained from the distillation of petroleum, such as kerosene distillate (boiling point 170 to 250° C.), diesel distillate, heavy gas oil distillate, and lubricating oil distillate (boiling point 350 to 550° C.), and mineral oil-based hydrocarbons obtained by a refining process such as fine distillation, extraction, or chemical processing. Mineral oil-based hydrocarbons are hydrocarbons that are derived from a mineral oil. Generally, they are an extremely complex mixture of hydrocarbons. Mineral oil-based hydrocarbons often include oil molecules with different types of structure in a single oil molecule, such as paraffin, naphthene, and an aromatic. Examples of mineral oil-based hydrocarbons include paraffin-based, naphthene-based, and aromatic-based hydrocarbons. In the present invention, any of these may be used. Paraffinic mineral oil-based hydrocarbons usually have a paraffin carbon number (% CP) of 50 or more in terms of carbon ratio based on ring analysis (n-d-M method). Naphthenic mineral oil-based hydrocarbons usually have a naphthene carbon number (% CN) of 30 to 45. Aromatic mineral oil-based hydrocarbons usually have an aromatic carbon number (% CA) of 35 or more. Mineral oil-based hydrocarbons are referred to by class names such as spindle oil, cylinder oil, liquid paraffin oil, machine oil, and turbine oil. However, in the present invention, any of these may be used.

Further, in the present invention, the hydrocarbon-based compound is not limited to a mineral oil-based hydrocarbon. A hydrocarbon-based compound obtained from some other derivation or obtained by some other production method may also be used. Examples of such hydrocarbon-based compounds include hydrocarbons artificially synthesized on the basis of a chemical means or the like, and hydrocarbons extracted and refined from a natural product. Specific examples include poly-α-olefins, and polyisobutylene (polybutene). Examples of a poly-α-olefin include a polymer or an oligomer obtained from 1-hexene, 1-octene, 1-nonene, 1-decene, 1-dodecene, 1-tetradecene and the like, or a hydride thereof.

When considering workability, it is preferred that the hydrocarbon-based compound used in the present invention has a kinematic viscosity at 40° C. of 50 mm$^2$/S or less, and more preferably 20 mm$^2$/S or less. Although the lower limit is not especially limited, usually the lower limit is 1 mm$^2$/S or more, and preferably 3 mm$^2$/S or more. The kinematic viscosity at 40° C. may be measured with a Cannon-Fenske, a Ubbelohde, or other such viscometer. The kinematic viscosity (refer to Table 1) of the hydrocarbon-based compounds used in the below-described Examples is also measured under the same conditions.

The hydrocarbon-based compound constituting the durability improving agent for a cement composition of the present invention has an average molecular weight of 150 to 600 and a pour point of 20° C. or less. By using such a hydrocarbon-based compound, the obtained durability improving agent for a cement composition can maintain good handling without being affected by the temperature during use. Although it is acceptable if the hydrocarbon-based compound used in the present invention has a pour point of 20° C. or less, from a handling perspective, a pour point of 0° C. or less is preferred, and a pour point of −10° C. or less is more preferred. Further, although it is acceptable if the hydrocarbon-based compound has an average molecular weight of 150 to 600, similarly from a handling perspective, 200 to 400 is preferred, and 250 to 350 is more preferred.

The term "average molecular weight" means weight average molecular weight (Mw) or number average molecular weight (Mn). Measurement of the average molecular weight may be carried out on the basis of, for example, GPC (Gel Permeation Chromatography) and GC-MS (Gas Chromatograph/Mass Spectrometry). Further, the term "pour point" refers to the temperature at which a substance stops flowing under fixed conditions. The pour point may be measured by a method prescribed in Japanese Industrial Standards K 2269 or ASTM 5949, for example. Specifically, a 45 mL sample in a test tube is heated to 45° C. The test tube is removed from a cooling bath at each temperature drop of 2.5° C. The temperature at which the sample does not flow at all for 5 seconds is read, and 2.5° C. is added to this value to obtain the pour point. The pour point in the Examples is also measured under these conditions.

Hydrocarbon-based compounds having a pour point of more than 20° C. are a solid at room temperature. Therefore, since the fluidity of the pre-hardened cement composition drastically deteriorates, such hydrocarbon-based compounds are not preferred. Further, since hydrocarbon-based compounds having a pour point of more than 20° C. are a solid at room temperature, it is difficult to uniformly disperse such a hydrocarbon-based compound in the cement composition. If the hydrocarbon-based compound is present in the cement composition as comparatively large lumps, there is the problem that the durability of the cement composition dramatically deteriorates. On the other hand, hydrocarbon-based compounds having an average molecular weight of less than 150 are highly volatile, and volatilize during the production of the cement composition. This not only makes it impossible to obtain the desired effects, but also makes the working environment worse because of the bad odor and increased risk of fire. Further, if a hydrocarbon-based compound having an average molecular weight of more than 600 is used, not only does handling deteriorate due to the increase in viscosity at low temperatures, but it becomes more difficult to uniformly disperse the hydrocarbon-based compound in the cement composition, thus making it impossible to obtain the desired performance.

The durability improving agent for a cement composition of the present invention may contain one type of hydrocarbon-based compound having an average molecular weight of 150 to 600 and a pour point of 20° C. or less, or may be a combination of two or more appropriately selected types.

It is preferred that the content of the hydrocarbon-based compound in the durability improving agent for a cement composition of the present invention is 5 wt. % or more. If this content is less than 5 wt. %, the intended durability, especially the intended freezing-thawing resistance, may not be able to be maintained. Further, this content is preferably 10 to 80 wt. %, more preferably 20 to 60 wt. %, and most preferably 25 to 40 wt. %.

The durability improving agent for a cement composition of the present invention may include a compound represented by the following general formula (I).

$$R\text{—}O\text{-}(AO)_n\text{—}H \qquad (I)$$

In the formula, R represents hydrogen or a hydrocarbon group having 1 to 8 carbon atoms, AO represents an oxyalkylene group having 2 to 4 carbon atoms, and n denotes an integer of 1 or more to 20 or less.

In the compound of the general formula (I), R represents hydrogen (a hydrogen atom) or a hydrocarbon group having 1 to 8 carbon atoms. It is preferred that R represents a hydrocarbon group having 2 to 6 carbon atoms, and most preferred that R represents a hydrocarbon group having 4 carbon atoms. If the carbon number is more than 8, it becomes more difficult to manage the amount of air introduced into the cement composition and the air size, which can have an adverse impact on the fluidity of the cement composition and the durability of the freezing-thawing resistance and shrinkage strength. Examples of R include a hydrogen atom; straight or branched chain alkyl groups such as methyl, ethyl, propyl, isopropyl, n-butyl, isobutyl, sec-butyl, tert-butyl, pentyl, isopentyl, hexyl, heptyl, and octyl; cycloalkyl groups such as cyclopropyl, cyclobutyl, cyclopentyl, cyclohexyl, cycloheptyl, and cyclooctyl; and aryl groups such as phenyl, benzyl, and phenethyl.

AO represents an oxyalkylene group having 2 to 4 carbon atoms. Examples of an oxyalkylene group having 2 to 4 carbon atoms include oxyethylene, oxypropylene, and oxybutylene. When n is 2 or more, the AOs constituting $(AO)_n$ may be the same type of oxyalkylene group or may be two or more different types of oxyalkylene group. Specifically, the $(AO)_n$ when n is 2 or more may be either a polyoxyalkylene group formed from a single oxyalkylene group or a polyoxyalkylene group formed from two or more types of oxyalkylene group. The oxyalkylene groups constituting $(AO)_n$ when n is 2 or more may be added in either blocks or randomly. It is preferred that $(AO)_n$ is a polyoxyalkylene group formed from oxyethylene groups and/or oxypropylene groups.

The average number of moles of the added oxyalkylene group is denoted as "n." It is preferred that "n" denotes an integer of 1 or more to 20 or less, preferably an integer of 15 or less, and more preferably an integer of 2 or more to 10 or less.

Examples of compounds represented by the general formula (I) when R represents hydrogen include ethylene glycol; a polyethylene glycol such as diethylene glycol, triethylene glycol, and polyethylene glycol; propylene glycol; a polypropylene glycol such as dipropylene glycol; and 1,2-propanediol, 1,2-butanediol, butylene glycol, polybutylene glycol, and a polyalkylene glycol in which two or more types of alkylene oxide are added as blocks or randomly. Among these, a polypropylene glycol is preferred. If using a polypropylene glycol, it is preferred that the number of repeating oxypropylene units (value of n in the general formula) is 15 or less, and more preferably 2 to 10.

On the other hand, when R represents a hydrocarbon group having 1 to 8 carbon atoms, preferred examples of compounds of the general formula (I) include diethylene glycol monobutyl ether, dipropylene glycol monomethyl ether, dipropylene glycol monopropyl ether, pentaethylene glycol monoisooctyl ether, polyoxyethylene isooctyl ether, and compounds obtained by adding a total of 2 to 10 moles of ethylene oxide and propylene oxide as blocks or randomly to 1 mole of an alcohol having 1 to 8 carbon atoms, such as methanol, ethanol, butyl alcohol, and 2-ethylhexanol.

As long as the durability improving agent for a cement composition of the present invention contains the above-described hydrocarbon-based compound, the present durability improving agent does not have to contain a compound of the general formula (I). By containing a compound of the general formula (I), the effect for reducing shrinkage can be even more dramatically improved. When the durability improving agent for a cement composition of the present invention does contain the compound of the general formula (I), the ratio of the hydrocarbon-based compound and the compound of the general formula (I) is, by weight, 5/95 to 99/1, preferably 10/90 to 70/30, and more preferably 20/80 to 40/60. By setting in this range, freezing-thawing resistance suitable for the environments that the cement composition is exposed to is exhibited, and an excellent effect for shrinkage reducing can be obtained.

In addition to the above-described active ingredient, the durability improving agent for a cement composition of the present invention may also contain an emulsifying agent. Including an emulsifying agent allows dispersibility when the above-described active ingredient is added into the cement composition to be improved. Examples of the emulsifying agent include, but are not limited to, an ester-based emulsifying agent such as a polyoxyalkylene alkyl ester, a polyhydric alcohol fatty acid ester, and alkylene oxide adducts of polyhydric alcohol fatty acid ester (for example, polyoxyethylene hydrogenated castor oil); a nitrogen-containing emulsifying agent such as polyoxyalkylene alkyl amine, a fatty acid alkanol amide, and alkylene oxide adducts of fatty acid alkanol amide; a solubilizing agent such as 3-methoxy-3-methyl-1-butanol; a polyoxyalkylene alkyl ether emulsifying agent other than a compound of the general formula (I) (for example, alkylene oxide adducts on an alcohol having 9 or more carbon atoms); and a fatty acid soap. Among these, preferred are alkylene oxide adducts of polyhydric alcohol fatty acid ester and a polyoxyalkylene alkyl ether emulsifying agent other than a compound of the general formula (I), and more preferred is alkylene oxide adducts of polyhydric alcohol fatty acid ester.

The content of the emulsifying agent in the durability improving agent for a cement composition is not especially limited. However, the content is preferably, with respect to 100 parts by weight of the durability improving agent for a cement composition, 0.01 to 20 parts by weight, and more preferably 0.5 to 15 parts by weight. The content of the emulsifying agent in the durability improving agent for a cement composition is not especially limited, and may be appropriately set.

The durability improving agent for a cement composition of the present invention may also contain water, whereby the working environment and safety can be improved. In the case of containing water in the durability improving agent for a cement composition of the present invention, the durability improving agent may be formed as an emulsion or as a dissolved product. The water content in the durability improving agent for a cement composition is not especially limited, and may be set appropriately.

The durability improving agent for a cement composition of the present invention may also be used by optionally combining or mixing with other admixtures (admixture materials). Examples of other admixtures include an air entraining agent (air entraining component), a defoamer (deforming component, foam suppressing component), a water reducing agent (standard type, delayed type, accelerated type), an air entraining and high-range water reducing agent (standard type, delayed type), a high-range water-reducing agent, a hardening accelerator, a plasticizer (standard type, delayed type), a shrinkage-reducing type air entraining and (high-range) water-reducing agent, a retarder, an accelerator, a set accelerating agent, a foaming agent, a corrosion inhibitor, a cold resistance accelerating agent, a stabilizing agent for adhered mortar, a darkening suppressant, a thickening agent, a separation reduction agent, a flocculating agent, a self-leveling agent, an anti-mold agent, blast furnace slag, fly ash, cinder ash, clinker ash, husk ash, silica fume, silica powder, gypsum, and an expansion material. The above-described admixtures (admixture materials) may be added alone or as a combination of two types or more. Further, when combining or mixing the durability improving agent for a cement composition with the above-described other admixture (admixture material), the method for adding the durability improving agent for a cement composition and the other admixture to the cement is not especially limited. Examples of the adding method include a method in which the durability improving agent for a cement composition and the above-described other admixture (admixture material) are separately added, and a method in which the other admixture and the durability improving agent are pre-mixed and then added.

The durability improving agent for a cement composition of the present invention can be added to the other materials constituting the cement composition when producing the cement composition. Consequently, a cement composition having excellent durability can be obtained.

The cement composition may include a hydraulic material, which is a cement paste (a mixture of water and cement), mortar (a mixture of fine aggregate and water in cement), or concrete (a mixture of coarse aggregate added to mortar), as well as other materials (admixtures (admixture materials)). Further, the cement composition may also be a hydration product containing calcium, silica, aluminum and the like.

As long as the cement is a hydraulic cement, it is not especially limited. Examples of the cement include Portland cements of such as ordinary, low-heat, moderate heat, high-early-strength, very-high-early strength, and sulfate-resisting type, low-alkali Portland cement, blast furnace cement (type A, type B, and type C), silica cement (type A, type B, and type C), fly ash cement (type A, type B, and type C), Eco-cement (regular, rapid hardening), silica fume cement, white Portland cement, alumina cement, ultra-rapid-hardening cement, grout cement, oil well cement, low heat cement, and a cement-based solidifying material. Further, examples of powder that can be included in the cement composition include silica fume, fly ash, limestone fine powder, blast furnace slag fine powder, an expansion material, and other mineral fine powders.

Examples of fine aggregate include river sand, mountain sand, sea sand, crushed sand, heavy aggregate, light aggregate, slag aggregate, and recycled aggregate.

Examples of coarse aggregate include river gravel, crushed rock, heavy aggregate, light aggregate, slag aggregate, and recycled aggregate.

The kind of water that may be used in the cement composition is not especially limited. Examples thereof include tap water and non-tap water (river water, lake water, well water etc.), and recycled water.

As described above, materials (admixtures) other than cement paste, mortar, and concrete may also be used in the cement composition. Such materials are not especially limited, as long as they are used in an amount that does not harm the effects of the present invention. As such admixtures, the examples mentioned above as admixtures that can be added to the durability improving agent for a cement composition may be utilized as is.

The production method, transportation method, laying method, curing method, and management method of the cement composition are not especially limited. The same methods as used for typical concrete may be applied.

The amount of the durability improving agent for a cement composition of the present invention added to the cement composition is not especially limited. The amount of the durability improving agent for a cement composition added to the cement composition is, with respect to the composition weight ratio of the cement composition, preferably 0.02 wt. % to 2 wt. %, and more preferably 0.05 wt. % to 1.5 wt. %. The composition weight ratio of the cement composition is the weight ratio of each constituent material (water, cement, (admixture material), fine aggregate, coarse aggregate etc.) in the cement composition with respect to the total weight.

The preparation method of the cement composition containing the durability improving agent for a cement composition of the present invention is not especially limited. If concrete is included as the hydraulic material in the cement composition, an example of such method is to add the durability improving agent for a cement composition of the present invention during the production of ready-mixed concrete or into the flesh concrete. Further, if the durability improving agent for a cement composition of the present invention does not contain water, the durability improving agent may be dissolved in water and then added to the other components constituting the cement composition. In addition, each of the components constituting the durability improving agent for a cement composition of the present invention may be added separately to produce the cement composition. For example, when including two or more hydrocarbon-based compounds as the active ingredients, and/or when also including one type or two or more types of the compounds of the general formula (I) as the active ingredients, the cement composition may be produced by separately adding over time each of these components to the cement.

If the durability improving agent for a cement composition of the present invention is added to a cement composition, the above-described hydrocarbon-based compound, which is an active ingredient, is incorporated into the cement composition. Consequently, since no water-soluble compound remains in the moisture in the pores of the cement composition, a cement composition can be obtained that exhibits a good hydration reaction and strength development without any adverse impact on the production process of the cement composition. Therefore, the durability improving agent for a cement composition of the present invention has little impact on freezing-thawing resistance even if the added amount is greater than for a conventional shrinkage reducing agent, so that an added amount that matches the shrinkage suppression amount can be added to the cement composition. Further, the inventive product that is contained in the cement composition suppresses the movement of moisture in the cement composition and the phase change behavior. Therefore, the freezing-thawing resistance of the cement composition can be sufficiently improved. In addition, the inventive product also plays a role of blocking the entry route of substances from the outside, and thus has an excellent substance blocking property. Consequently, by adding the durability improving agent for a cement composition to a cement composition, the durability improving agent can exhibit an effect of improving durability.

EXAMPLES

The effectiveness of the present invention will now be described using the following Examples and Comparative Examples. However, the present invention is not limited to only these Examples.

The properties of the hydrocarbon-based compounds used in the following Examples are shown in Table 1.

Examples 1 to 16 and Comparative Examples 1 to 12

Table 2

Concrete compositions were prepared in the following manner, and subjected to concrete testing which are a flesh concrete test, a drying shrinkage test, a carbonation test, and a freezing-thawing test.

Test 1-1 Flesh Concrete Test

Under the concrete preparation conditions shown in Table 3, concrete was mixed in a room having an ambient temperature of 20° C. using an equal mixture of three types of ordinary Portland cement (density=3.16 g/cm$^3$), fine aggregate (Kakegawa mountain sand, density=2.58 g/cm$^3$), and coarse aggregate (Ome crushed hard sandstone, density=2.67 g/cm$^3$). At each stage, 1 wt. % of an AE water reducing agent, standard type Flowric S, manufactured by Flowric Co., Ltd., was added with respect to the cement weight. The target slump was set at 18±2.5 cm. Concerning air content, the target air content was set at 4.5±1.5%. To achieve the target air content, adjustment was carried out using AE-4 (the surfactant having a rosin acid potassium salt as a main component) manufactured by Flowric Co., Ltd. After the concrete was prepared, the durability improving agent (Examples) or comparison product (Comparative Examples) shown in Table 2 was mixed in the amounts shown in Table 4 or 5. The concrete was then mixed by the mixer to produce concrete compositions. The properties of the hydrocarbon-based compounds in the durability improving agents are as shown in Table 1. The values in brackets for the polypropylene glycol (600) shown in Table 2 represent average molecular weight, and the values in brackets for the polyoxyethylene (6) isooctyl ether represent the number of repeating oxyethylene units. Further, the composition ratio values for each component in Table 2 are all composition ratio values in terms of weight. In addition, W/C, s/a, W, C, S, and G in Table 3 represent the water cement ratio, the fine aggregate ratio, the unit water content, the unit cement content, the unit fine aggregate content, and the unit coarse aggregate content, respectively.

Tables 4 and 5 show the slump value (SL), the slump flow, the air content (Air), and C.T. (concrete mixing temperature). The slump value was measured based on JIS A 1101:2005, and the air content was measured based on JIS A 1128:2005.

Specifically, the slump value was measured as follows. A metal slump cone having an upper edge inner diameter of 100 mm, a lower edge inner diameter of 200 mm, a height of 300 mm, and a thickness of 5 mm or more was put and held on a horizontally-arranged smooth flat plate that was tough and water tight. Then, a sample was filled into the slump cone in three layers of equal amounts. Each layer was made even using a metal round bar having a diameter of 16 mm and a length of 500 to 600 mm whose tip was semicircular. Then, the round bar was pushed in the same manner 25 times into the sample, so that the upper face was level with the upper edge of the slump cone. Then, the slump cone was gently raised vertically over 2 to 3 seconds. The slump value was obtained by measuring the subsidence in the middle portion of the sample in 0.5 cm units. The slump flow was calculated by, after the concrete had stopped moving, taking the average of the diameter at which the sample appeared to be at its broadest and the diameter in the orthogonal direction thereto.

The air content was measured based on Boyle's law using an air chamber pressure method. Used was a water-tight, strong cylindrical vessel that was provided with a flange and a cover, and was air tight when pressurized. The cover was similarly water tight and sufficiently strong. The used vessel also had a water inlet and a water (gas) outlet. An air chamber having a capacity of about 5% of the vessel was provided in an upper portion of the cover. This air chamber had a pressure regulation valve, an air hand pump, a pressure gauge, and an operation valve. The sample was filled to about ⅓ of the vessel. Then, a metal round bar having a length of 500 to 600 mm whose tip was semicircular was pushed in the same manner 25 times taking care not to hit the bottom of the vessel. Then, the side face of the vessel was hit 10 to 15 times so that the holes formed by the round bar disappeared and so that no large bubbles could be seen on the surface of the sample. Next, the sample was filled to about ⅔ of the vessel, and the previous operation was repeated in the same manner. Finally, the sample was filled so that it slightly overflowed the vessel, and the previous operation was repeated in the same manner. Then, excess sample was wiped off with a straight board to make the sample even, and the sample surface and the vessel upper face were made to correctly align. The cover was placed on the vessel and closed so that air could not leak out. Then, water was poured in from the water inlet to drive out the air between the rear face of the cover and the surface of the water. Then, all of the valves were shut, whereby the pressure in the air chamber increased. The needle was aligned with the initial pressure scale, and then the operation valve was sufficiently opened. The air content was measured by confirming the air content indicated by the needle.

Test 1-2 Drying Shrinkage Test and Carbonation Test

The drying shrinkage test was carried out as follows based on JIS A 1129:2001. Concrete compositions were prepared in the same manner as in the above Test 1-1. Each concrete composition was laid, and then a 10×10×40 cm test specimen was immediately produced. Twenty-four hours later, the molds were removed, and a marked line was drawn. Curing was carried out for 1 week in water at 20° C. Subsequently, the test specimens were stored in a constant temperature and humidity room at 20° C. and at 60% R.H., and the drying shrinkage ratio was measured. The drying shrinkage ratio results at drying material ages of 1 week, 4 weeks, 8 weeks, and 13 weeks for each of Examples and Comparative Examples are shown in Tables 6 and 7. Further, Tables 6 and 7 also show the drying shrinkage ratios at a drying material age of 13 weeks for each of the Examples and Comparative Examples with respect to Comparative Example 1. The carbonation test was carried out as follows based on JIS A 1153:2003. Each of the concrete compositions prepared in the above Test 1-1 was laid, and then a 10×10×40 cm test specimen was immediately produced. Twenty-four hours later, the molds were removed. Curing was carried out for 4 weeks in water at 20° C. Subsequently, the test specimens were stored in a constant temperature and humidity room at 20° C. and at 60% R.H. for 4 weeks, and then stored in a room under accelerating constant temperature and humidity—at 20° C. and at 60% R.H. with a carbon dioxide gas concentration increased to 5%. Substance blocking performance was evaluated by measuring the carbonated depth. The carbonated depth at an accelerated material age of week 13 for Examples and Comparative Examples is shown in Tables 6 and 7. The shallower the carbonated depth, the better the substance blocking property is said to be.

Test 1-3 Freezing-Thawing Test

The freezing-thawing test was carried out as follows based on JIS A 1148:2001 (method A). Concrete compositions were prepared in the same manner as in the above Test 1-1. Each concrete composition was laid, and then a 10×10×40 cm test specimen was immediately produced. Twenty-four hours later, the molds were removed. Curing was carried out for 4 weeks in water at 20° C. A durability index was determined by carrying out a freezing-thawing test at 300 cycles (c). The durability index for each of the Examples and Comparative Examples is shown in Tables 8 and 9. Generally, it is said that freezing-thawing resistance is good if the durability index of a concrete composition is 60% or more.

TABLE 1

HYDROCARBON-BASED COMPOUND PROPERTIES

|  | TYPE | 40° C. KINEMATIC VISCOSITY (mm²/s) | WEIGHT AVERAGE MOLECULAR WEIGHT | POUR POINT (° C.) |
|---|---|---|---|---|
| HYDROCARBON-BASED COMPOUND A | MINERAL OIL CP59 % | 9.4 | 286 | −5 |
| HYDROCARBON-BASED COMPOUND B | MINERAL OIL CP62 % | 21.1 | 377 | −7.5 |
| HYDROCARBON-BASED COMPOUND C | MINERAL OIL CP68 % | 63.3 | 485 | −15 |
| HYDROCARBON-BASED COMPOUND D | MINERAL OIL CP61 % | 4.6 | 222 | 0 |
| HYDROCARBON-BASED COMPOUND E | POLYBUTENE | 205 | 500 | −32.5 |
| HYDROCARBON-BASED COMPOUND F | SOLID PARAFFIN | — | 440 | 60° C. (MELTING POINT) |
| HYDROCARBON-BASED COMPOUND G | SOLID PARAFFIN | — | 300 | 47° C. (MELTING POINT) |

TABLE 2

EXAMPLE COMPOSITION

COMPOSITION SUMMARY

|  | HYDROCARBON-BASED COMPOUND | | COMPOUND OF THE GENERAL FORMULA (I) | | OTHER COMPONENT | | WATER |
|---|---|---|---|---|---|---|---|
|  | COMPOUND | RATIO OF COMPOSITION IN PREPARATION | COMPOUND | RATIO OF COMPOSITION IN PREPARATION | COMPOUND | RATIO OF COMPOSITION IN PREPARATION | RATIO OF COMPOSITION IN PREPARATION |
| EXAMPLE 1 | HYDROCARBON-BASED COMPOUND A | 100.00 | — | — | — | — | — |
| EXAMPLE 2 | HYDROCARBON-BASED COMPOUND A | 30.00 | DIETHYLENE GLYCOL MONOBUTYL ETHER | 70.00 | — | — | — |
| EXAMPLE 3 | HYDROCARBON-BASED COMPOUND A | 20.00 | DIETHYLENE GLYCOL MONOBUTYL ETHER | 80.00 | — | — | — |
| EXAMPLE 4 | HYDROCARBON-BASED COMPOUND A | 27.00 | DIETHYLENE GLYCOL MONOBUTYL ETHER | 63.00 | POLYOXYETHYLENE HYDROGENATED CASTOR OIL | 10.00 | — |
| EXAMPLE 5 | HYDROCARBON-BASED COMPOUND A | 35.00 | DIETHYLENE GLYCOL MONOBUTYL ETHER | 40.00 | POLYOXYETHYLENE HYDROGENATED CASTOR OIL | 4.00 | 21.00 |
| EXAMPLE 6 | HYDROCARBON-BASED COMPOUND A | 23.00 | DIETHYLENE GLYCOL MONOBUTYL ETHER | 60.00 | POLYOXYETHYLENE HYDROGENATED CASTOR OIL | 3.00 | 14.00 |
| EXAMPLE 7 | HYDROCARBON-BASED COMPOUND A | 11.60 | DIETHYLENE GLYCOL MONOBUTYL ETHER | 80.00 | POLYOXYETHYLENE HYDROGENATED CASTOR OIL | 1.40 | 7.00 |
| EXAMPLE 8 | HYDROCARBON-BASED COMPOUND B | 27.00 | DIETHYLENE GLYCOL MONOBUTYL ETHER | 63.00 | COCONUT FATTY ACID DIETHANOL AMIDE | 10.00 | — |
| EXAMPLE 9 | HYDROCARBON-BASED COMPOUND C | 40.00 | DIPROPYLENE GLYCOL MONOMETHYL ETHER | 60.00 | — | — | — |
| EXAMPLE 10 | HYDROCARBON-BASED COMPOUND D | 40.00 | DIPROPYLENE GLYCOL MONOPROPYL ETHER | 60.00 | — | — | — |
| EXAMPLE 11 | HYDROCARBON-BASED COMPOUND E | 40.00 | DIETHYLENE GLYCOL MONOBUTYL ETHER | 60.00 | — | — | — |
| EXAMPLE 12 | HYDROCARBON-BASED COMPOUND A | 40.00 | POLYOXYETHYLENE (6) ISOOCTYL ETHER | 60.00 | — | — | — |
| EXAMPLE 13 | HYDROCARBON-BASED COMPOUND A | 40.00 | POLYPROPYLENE GLYCOL (600) | 60.00 | — | — | — |

TABLE 2-continued

EXAMPLE COMPOSITION

COMPOSITION SUMMARY

| | HYDROCARBON-BASED COMPOUND | | COMPOUND OF THE GENERAL FORMULA (I) | | OTHER COMPONENT | | WATER |
|---|---|---|---|---|---|---|---|
| | COMPOUND | RATIO OF COMPOSITION IN PREPARATION | COMPOUND | RATIO OF COMPOSITION IN PREPARATION | COMPOUND | RATIO OF COMPOSITION IN PREPARATION | RATIO OF COMPOSITION IN PREPARATION |
| EXAMPLE 14 | HYDROCARBON-BASED COMPOUND A | 27.00 | DIPROPYLENE GLYCOL MONOMETHYL ETHER | 63.00 | POLYOXYALKYLENE ALKYL ETHER (*) | 10.00 | — |
| EXAMPLE 15 | HYDROCARBON-BASED COMPOUND A | 27.00 | POLYOXYETHYLENE (6) ISOOCTYL ETHER | 63.00 | POLYOXYETHYLENE HYDROGENATED CASTOR OIL | 10.00 | — |
| EXAMPLE 16 | HYDROCARBON-BASED COMPOUND A | 27.00 | POLYPROPYLENE GLYCOL (600) | 63.00 | POLYOXYETHYLENE HYDROGENATED CASTOR OIL | 10.00 | — |
| COMPARATIVE EXAMPLE 1 | — | — | — | — | — | — | — |
| COMPARATIVE EXAMPLE 2 | HYDROCARBON-BASED COMPOUND F | 100.00 | — | — | — | — | — |
| COMPARATIVE EXAMPLE 3 | HYDROCARBON-BASED COMPOUND G | 100.00 | — | — | — | — | — |
| COMPARATIVE EXAMPLE 4 | HYDROCARBON-BASED COMPOUND F | 40.00 | DIETHYLENE GLYCOL MONOBUTYL ETHER | 60.00 | — | — | — |
| COMPARATIVE EXAMPLE 5 | HYDROCARBON-BASED COMPOUND G | 40.00 | DIETHYLENE GLYCOL MONOBUTYL ETHER | 60.00 | — | — | — |
| COMPARATIVE EXAMPLE 6 | — | — | DIETHYLENE GLYCOL MONOBUTYL ETHER | 100.00 | — | — | — |
| COMPARATIVE EXAMPLE 7 | — | — | DIPROPYLENE GLYCOL MONOMETHYL ETHER | 100.00 | — | — | — |
| COMPARATIVE EXAMPLE 8 | — | — | DIPROPYLENE GLYCOL MONOPROPYL ETHER | 100.00 | — | — | — |
| COMPARATIVE EXAMPLE 9 | — | — | POLYOXYETHYLENE (6) ISOOCTYL ETHER | 100.00 | — | — | — |
| COMPARATIVE EXAMPLE 10 | COMERCIALLY-AVAILABLE PRODUCT A (POLYPROPYLENE GLYCOL) | | | 100.00 | — | — | — |
| COMPARATIVE EXAMPLE 11 | COMERCIALLY-AVAILABLE PRODUCT B (A POLYALKYLENE GLYCOL-BASED COMPOUND) | | | 100.00 | — | — | — |
| COMPARATIVE EXAMPLE 12 | COMERCIALLY-AVAILABLE PRODUCT C (A POLYOXYALKYLENE ALKYL ETHER COMPOUND) | | | 100.00 | — | — | — |

(*) Main component: a lauryl alcohol PO 3 mole EO 6 mole adduct

TABLE 3

CONCRETE PREPARATION

| TYPE | W/C | s/a | UNIT CONTENT (kg/m³) | | | | DESIGN AIR CONTENT (%) | INVENTIVE PRODUCT AND COMPARISON PRODUCT ADDED RATIO (C × %) |
|---|---|---|---|---|---|---|---|---|
| | | | W | C | S | G | | |
| BASE CONCRETE | 0.50 | 0.44 | 178 | 356 | 759 | 986 | 4.5 | — |
| INVENTIVE | | | | | | | | 1.12 to 3.75 |

TABLE 3-continued

| | | | | | | | DESIGN AIR CONTENT | INVENTIVE PRODUCT AND COMPARISON PRODUCT ADDED |
|---|---|---|---|---|---|---|---|---|
| | | | UNIT CONTENT (kg/m³) | | | | | |
| TYPE | W/C | s/a | W | C | S | G | (%) | RATIO (C × %) |
| PRODUCT AND COMPARISON PRODUCT CONCRETE | | | | | | | | |

TABLE 4

FRESH CONCRETE TEST (TEST 1-1) RESULTS (1)

| | ADDED RATIO OF INVENTIVE PRODUCT AND COMPARISON PRODUCT (C × %) | TEST RESULTS | | | |
|---|---|---|---|---|---|
| | | SLUMP (cm) | SLUMP FLOW (mm) | AIR CONTENT (%) | C.T. (°C.) |
| EXAMPLE 1 | 1.12 | 19.0 | 315 | 5.5 | 22.0 |
| EXAMPLE 2 | 1.60 | 19.5 | 325 | 5.5 | 20.5 |
| EXAMPLE 3 | 1.40 | 20.0 | 335 | 5.2 | 21.0 |
| EXAMPLE 4 | 1.78 | 20.0 | 330 | 5.3 | 20.5 |
| EXAMPLE 5 | 2.81 | 20.5 | 340 | 5.5 | 20.5 |
| EXAMPLE 6 | 1.87 | 20.0 | 355 | 5.9 | 20.0 |
| EXAMPLE 7 | 1.40 | 19.5 | 340 | 5.6 | 20.0 |
| EXAMPLE 8 | 1.78 | 19.5 | 335 | 5.3 | 20.5 |
| EXAMPLE 9 | 1.87 | 20.0 | 350 | 5.8 | 20.5 |
| EXAMPLE 10 | 1.87 | 19.5 | 330 | 4.7 | 20.5 |
| EXAMPLE 11 | 1.87 | 19.9 | 335 | 5.3 | 20.5 |
| EXAMPLE 12 | 1.87 | 20.5 | 350 | 5.6 | 20.5 |
| EXAMPLE 13 | 1.87 | 20.5 | 345 | 5.3 | 20.5 |
| EXAMPLE 14 | 1.78 | 20.0 | 345 | 5.2 | 20.0 |
| EXAMPLE 15 | 1.78 | 20.0 | 330 | 4.8 | 20.5 |
| EXAMPLE 16 | 1.78 | 20.5 | 335 | 5.1 | 21.0 |
| COMPARATIVE EXAMPLE 1 | — | 19.5 | 330 | 5.5 | 21.0 |
| COMPARATIVE EXAMPLE 2 | 1.12 | 18.0 | 290 | 4.5 | 21.0 |
| COMPARATIVE EXAMPLE 3 | 1.12 | 18.0 | 280 | 4.7 | 21.0 |
| COMPARATIVE EXAMPLE 4 | 1.87 | 18.5 | 300 | 4.8 | 21.0 |
| COMPARATIVE EXAMPLE 5 | 1.87 | 18.5 | 295 | 5.0 | 21.0 |
| COMPARATIVE EXAMPLE 6 | 1.12 | 19.5 | 330 | 5.8 | 20.5 |
| COMPARATIVE EXAMPLE 7 | 1.12 | 20.5 | 335 | 5.9 | 20.5 |
| COMPARATIVE EXAMPLE 8 | 1.12 | 19.5 | 330 | 5.8 | 21.0 |
| COMPARATIVE EXAMPLE 9 | 1.12 | 18.5 | 310 | 6.0 | 21.0 |
| COMPARATIVE EXAMPLE 10 | 1.12 | 19.0 | 315 | 5.4 | 21.5 |
| COMPARATIVE EXAMPLE 11 | 1.12 | 19.5 | 340 | 5.5 | 21.0 |
| COMPARATIVE EXAMPLE 12 | 1.12 | 19.0 | 320 | 5.2 | 21.0 |

TABLE 5

FRESH CONCRETE TEST (TEST 1-1) RESULTS (2)

| | ADDED RATIO OF INVENTIVE PRODUCT AND COMPARISON PRODUCT (C × %) | TEST RESULTS | | | |
|---|---|---|---|---|---|
| | | SLUMP (cm) | SLUMP FLOW (mm) | AIR CONTENT (%) | C.T. (°C.) |
| EXAMPLE 1 | 2.24 | 20.0 | 300 | 5.3 | 21.5 |
| EXAMPLE 2 | 3.20 | 20.5 | 355 | 5.2 | 21.5 |
| EXAMPLE 3 | 2.80 | 21.0 | 345 | 4.8 | 20.5 |
| EXAMPLE 4 | 3.56 | 20.5 | 335 | 5.1 | 20.5 |
| EXAMPLE 5 | 3.74 | 20.0 | 360 | 5.3 | 20.0 |
| EXAMPLE 6 | 2.80 | 20.5 | 345 | 6.0 | 20.0 |
| EXAMPLE 7 | 3.56 | 20.5 | 350 | 5.5 | 20.5 |
| EXAMPLE 8 | 3.75 | 21.0 | 355 | 5.6 | 20.5 |
| EXAMPLE 9 | 3.75 | 20.5 | 345 | 5.5 | 20.0 |
| EXAMPLE 10 | 3.75 | 20.0 | 345 | 5.2 | 20.5 |

TABLE 5-continued

FRESH CONCRETE TEST (TEST 1-1) RESULTS (2)

| | ADDED RATIO OF INVENTIVE PRODUCT AND COMPARISON PRODUCT (C × %) | TEST RESULTS | | | |
|---|---|---|---|---|---|
| | | SLUMP (cm) | SLUMP FLOW (mm) | AIR CONTENT (%) | C.T. (°C.) |
| EXAMPLE 11 | 3.75 | 20.5 | 340 | 5.1 | 20.5 |
| EXAMPLE 12 | 3.75 | 20.5 | 335 | 5.0 | 21.0 |
| EXAMPLE 13 | 3.56 | 21.0 | 345 | 5.2 | 20.5 |
| EXAMPLE 14 | 3.56 | 20.5 | 350 | 5.5 | 20.5 |
| EXAMPLE 15 | 3.56 | 21.0 | 345 | 5.6 | 21.0 |
| EXAMPLE 16 | 3.56 | 19.5 | 330 | 5.5 | 21.0 |
| COMPARATIVE EXAMPLE 1 | — | 19.5 | 330 | 5.5 | 21.0 |
| COMPARATIVE EXAMPLE 2 | 2.24 | 17.5 | 280 | 4.8 | 21.0 |
| COMPARATIVE EXAMPLE 3 | 2.24 | 17.5 | 275 | 4.6 | 21.0 |
| COMPARATIVE EXAMPLE 4 | 3.75 | 18.0 | 285 | 5.0 | 21.0 |
| COMPARATIVE EXAMPLE 5 | 3.75 | 18.0 | 285 | 5.2 | 21.0 |
| COMPARATIVE EXAMPLE 6 | 2.24 | 20.5 | 365 | 5.3 | 20.0 |
| COMPARATIVE EXAMPLE 7 | 2.24 | 20.5 | 345 | 5.0 | 20.5 |
| COMPARATIVE EXAMPLE 8 | 2.24 | 20.5 | 350 | 5.2 | 21.0 |
| COMPARATIVE EXAMPLE 9 | 2.24 | 19.5 | 335 | 5.6 | 20.5 |
| COMPARATIVE EXAMPLE 10 | 2.24 | 20.5 | 345 | 5.3 | 20.5 |
| COMPARATIVE EXAMPLE 11 | 2.24 | 19.5 | 335 | 5.2 | 21.0 |
| COMPARATIVE EXAMPLE 12 | 2.24 | 18.0 | 310 | 4.5 | 21.0 |

TABLE 6

DRYING SHRINKAGE AND CARBONATION TEST (TEST 1-2) RESULTS (1)

| | ADDED RATIO OF INVENTIVE PRODUCT AND COMPARISON PRODUCT (C × %) | DRYING SHRINKAGE RATIO (×10$^{-4}$) DRYING PERIOD | | | | DRYING SHRINKAGE RATIO WITH RESPECT TO COMPARATIVE EXAMPLE 1 (%) DRYING PERIOD | | | | CARBONATION DEPTH (mm) ACCELERATED PERIOD |
|---|---|---|---|---|---|---|---|---|---|---|
| | | 1 WEEK | 4 WEEK | 8 WEEK | 13 WEEK | 1 WEEK | 4 WEEK | 8 WEEK | 13 WEEK | 13 WEEK |
| EXAMPLE 1 | 1.12 | 1.60 | 3.05 | 4.64 | 5.90 | 62 | 60 | 70 | 77 | 4.29 |
| EXAMPLE 2 | 1.60 | 1.55 | 3.07 | 4.70 | 5.72 | 60 | 60 | 71 | 75 | 3.25 |
| EXAMPLE 3 | 1.40 | 1.58 | 3.22 | 4.57 | 5.80 | 61 | 63 | 69 | 76 | — |
| EXAMPLE 4 | 1.78 | 1.61 | 3.22 | 4.50 | 5.88 | 62 | 63 | 68 | 77 | 4.47 |
| EXAMPLE 5 | 2.81 | 1.39 | 3.01 | 4.62 | 5.84 | 54 | 59 | 70 | 77 | — |
| EXAMPLE 6 | 1.87 | 1.57 | 3.10 | 4.66 | 5.96 | 61 | 61 | 70 | 78 | — |
| EXAMPLE 7 | 1.40 | 1.61 | 3.23 | 4.62 | 5.78 | 62 | 63 | 70 | 76 | — |
| EXAMPLE 8 | 1.78 | 1.45 | 2.96 | 4.63 | 5.80 | 56 | 58 | 70 | 76 | 3.69 |
| EXAMPLE 9 | 1.87 | 2.14 | 4.09 | 5.58 | 6.79 | 83 | 80 | 84 | 89 | — |
| EXAMPLE 10 | 1.87 | 1.65 | 3.12 | 4.46 | 5.88 | 64 | 61 | 67 | 77 | — |
| EXAMPLE 11 | 1.87 | 1.70 | 3.35 | 4.75 | 6.21 | 66 | 66 | 72 | 88 | — |
| EXAMPLE 12 | 1.87 | 1.84 | 4.04 | 5.56 | 6.71 | 71 | 79 | 84 | 88 | — |
| EXAMPLE 13 | 1.87 | 1.63 | 3.22 | 4.77 | 6.10 | 63 | 63 | 72 | 80 | — |
| EXAMPLE 14 | 1.78 | 2.12 | 3.99 | 5.36 | 6.49 | 82 | 78 | 81 | 85 | — |
| EXAMPLE 15 | 1.78 | 1.86 | 4.00 | 5.43 | 6.56 | 72 | 78 | 82 | 86 | — |
| EXAMPLE 16 | 1.78 | 1.66 | 3.17 | 4.70 | 5.95 | 64 | 62 | 71 | 78 | — |
| COMPARATIVE EXAMPLE 1 | — | 2.59 | 5.11 | 6.62 | 7.63 | 100 | 100 | 100 | 100 | 4.68 |
| COMPARATIVE EXAMPLE 2 | 1.12 | 2.48 | 5.08 | 6.63 | 7.62 | 96 | 99 | 100 | 100 | 4.92 |
| COMPARATIVE EXAMPLE 3 | 1.12 | 2.42 | 5.00 | 6.40 | 7.38 | 93 | 98 | 97 | 97 | — |
| COMPARATIVE EXAMPLE 4 | 1.87 | 2.12 | 4.00 | 5.51 | 6.72 | 82 | 78 | 83 | 88 | 5.35 |
| COMPARATIVE EXAMPLE 5 | 1.87 | 2.10 | 3.85 | 5.20 | 6.32 | 81 | 75 | 79 | 83 | — |
| COMPARATIVE EXAMPLE 6 | 1.12 | 1.61 | 3.23 | 4.64 | 5.90 | 62 | 63 | 70 | 77 | — |
| COMPARATIVE EXAMPLE 7 | 1.12 | 2.20 | 4.19 | 5.76 | 7.02 | 85 | 82 | 87 | 92 | — |
| COMPARATIVE EXAMPLE 8 | 1.12 | 1.76 | 3.32 | 4.83 | 6.49 | 68 | 65 | 73 | 85 | — |
| COMPARATIVE EXAMPLE 9 | 1.12 | 1.86 | 4.09 | 5.67 | 6.84 | 72 | 80 | 86 | 90 | 6.05 |
| COMPARATIVE EXAMPLE 10 | 1.12 | 1.20 | 3.38 | 4.90 | 6.26 | 46 | 66 | 74 | 82 | 7.08 |

TABLE 6-continued

DRYING SHRINKAGE AND CARBONATION TEST (TEST 1-2) RESULTS (1)

| | ADDED RATIO OF INVENTIVE PRODUCT AND COMPARISON PRODUCT (C × %) | DRYING SHRINKAGE RATIO ($\times 10^{-4}$) DRYING PERIOD | | | | DRYING SHRINKAGE RATIO WITH RESPECT TO COMPARATIVE EXAMPLE 1 (%) DRYING PERIOD | | | | CARBONATION DEPTH (mm) ACCELERATED PERIOD |
|---|---|---|---|---|---|---|---|---|---|---|
| | | 1 WEEK | 4 WEEK | 8 WEEK | 13 WEEK | 1 WEEK | 4 WEEK | 8 WEEK | 13 WEEK | 13 WEEK |
| COMPARATIVE EXAMPLE 11 | 1.12 | 1.80 | 3.43 | 4.84 | 5.82 | 69 | 67 | 73 | 76 | — |
| COMPARATIVE EXAMPLE 12 | 1.12 | 1.52 | 3.23 | 4.89 | 5.89 | 59 | 63 | 74 | 77 | 6.26 |

TABLE 7

DRYING SHRINKAGE AND CARBONATION TEST (TEST 1-2) RESULTS (2)

| | ADDED RATIO OF INVENTIVE PRODUCT AND COMPARISON PRODUCT (C × %) | DRYING SHRINKAGE RATIO ($\times 10^{-4}$) DRYING PERIOD | | | | DRYING SHRINKAGE RATIO WITH RESPECT TO COMPARATIVE EXAMPLE 1 (%) DRYING PERIOD | | | | CARBONATION DEPTH (mm) ACCELERATED PERIOD |
|---|---|---|---|---|---|---|---|---|---|---|
| | | 1 WEEK | 4 WEEK | 8 WEEK | 13 WEEK | 1 WEEK | 4 WEEK | 8 WEEK | 13 WEEK | 13 WEEK |
| EXAMPLE 1 | 2.24 | 1.65 | 3.43 | 4.82 | 6.24 | 64 | 67 | 73 | 82 | 3.74 |
| EXAMPLE 2 | 3.20 | 1.35 | 2.30 | 3.18 | 4.35 | 52 | 45 | 48 | 57 | 3.38 |
| EXAMPLE 3 | 2.80 | 1.17 | 2.04 | 2.78 | 3.89 | 45 | 40 | 42 | 51 | — |
| EXAMPLE 4 | 3.56 | 1.32 | 2.15 | 3.24 | 4.50 | 51 | 42 | 49 | 59 | 4.00 |
| EXAMPLE 5 | 3.74 | 1.35 | 2.20 | 3.31 | 4.43 | 52 | 43 | 50 | 58 | — |
| EXAMPLE 6 | 2.80 | 1.43 | 2.30 | 3.33 | 4.47 | 55 | 45 | 50 | 59 | — |
| EXAMPLE 7 | 3.56 | 1.38 | 2.37 | 3.39 | 4.44 | 53 | 46 | 51 | 58 | — |
| EXAMPLE 8 | 3.75 | 1.37 | 2.35 | 3.24 | 4.43 | 53 | 46 | 49 | 58 | 3.35 |
| EXAMPLE 9 | 3.75 | 1.55 | 2.91 | 4.04 | 5.34 | 60 | 57 | 61 | 70 | — |
| EXAMPLE 10 | 3.75 | 1.42 | 2.40 | 3.44 | 4.58 | 55 | 47 | 52 | 60 | — |
| EXAMPLE 11 | 3.75 | 1.48 | 2.55 | 3.51 | 4.88 | 57 | 50 | 53 | 64 | — |
| EXAMPLE 12 | 3.75 | 1.55 | 2.71 | 3.77 | 5.26 | 60 | 53 | 57 | 69 | — |
| EXAMPLE 13 | 3.56 | 1.50 | 2.50 | 3.51 | 4.88 | 58 | 49 | 53 | 64 | — |
| EXAMPLE 14 | 3.56 | 1.58 | 2.91 | 4.17 | 5.49 | 61 | 57 | 63 | 72 | — |
| EXAMPLE 15 | 3.56 | 1.53 | 2.81 | 3.71 | 5.19 | 59 | 55 | 56 | 68 | — |
| EXAMPLE 16 | 3.56 | 1.48 | 2.45 | 3.44 | 4.81 | 57 | 48 | 52 | 63 | — |
| COMPARATIVE EXAMPLE 1 | — | 2.59 | 5.11 | 6.62 | 7.63 | 100 | 100 | 100 | 100 | 4.68 |
| COMPARATIVE EXAMPLE 2 | 2.24 | 2.62 | 5.23 | 6.68 | 7.76 | 101 | 102 | 101 | 102 | 4.90 |
| COMPARATIVE EXAMPLE 3 | 2.24 | 2.42 | 5.00 | 6.31 | 7.31 | 93 | 98 | 95 | 96 | — |
| COMPARATIVE EXAMPLE 4 | 3.56 | 1.62 | 2.90 | 4.15 | 5.40 | 63 | 57 | 63 | 71 | 5.85 |
| COMPARATIVE EXAMPLE 5 | 3.56 | 1.54 | 2.85 | 4.02 | 5.39 | 59 | 56 | 61 | 71 | — |
| COMPARATIVE EXAMPLE 6 | 2.24 | 1.25 | 2.42 | 3.49 | 4.67 | 48 | 47 | 53 | 61 | — |
| COMPARATIVE EXAMPLE 7 | 2.24 | 1.66 | 3.12 | 4.57 | 6.03 | 64 | 61 | 69 | 79 | — |
| COMPARATIVE EXAMPLE 8 | 2.24 | 1.55 | 2.76 | 3.84 | 5.11 | 60 | 54 | 58 | 67 | — |
| COMPARATIVE EXAMPLE 9 | 2.24 | 1.61 | 2.96 | 4.17 | 5.34 | 62 | 58 | 63 | 70 | — |
| COMPARATIVE EXAMPLE 10 | 2.24 | 1.61 | 2.81 | 3.84 | 5.11 | 62 | 55 | 58 | 67 | — |
| COMPARATIVE EXAMPLE 11 | 2.24 | 1.67 | 3.21 | 4.64 | 5.41 | 65 | 63 | 70 | 71 | — |
| COMPARATIVE EXAMPLE 12 | 2.24 | 1.36 | 2.67 | 3.99 | 4.95 | 52 | 52 | 60 | 65 | 5.91 |

TABLE 8

FREEZING-THAWING TEST (TEST 1-3) RESULTS (1)

| | ADDED RATIO OF INVENTIVE PRODUCT AND COMPARISON PRODUCT (C × %) | DURABILITY INDEX |
|---|---|---|
| EXAMPLE 1 | 1.12 | 98 |
| EXAMPLE 2 | 1.60 | 92 |
| EXAMPLE 3 | 1.40 | 91 |
| EXAMPLE 4 | 1.78 | 96 |
| EXAMPLE 5 | 2.81 | 94 |
| EXAMPLE 6 | 1.87 | 97 |
| EXAMPLE 7 | 1.40 | 76 |
| EXAMPLE 8 | 1.78 | 92 |
| EXAMPLE 9 | 1.87 | 96 |
| EXAMPLE 10 | 1.87 | 76 |
| EXAMPLE 11 | 1.87 | 85 |
| EXAMPLE 12 | 1.87 | 94 |
| EXAMPLE 13 | 1.87 | 96 |
| EXAMPLE 14 | 1.78 | 76 |
| EXAMPLE 15 | 1.78 | 91 |
| EXAMPLE 16 | 1.78 | 96 |
| COMPARATIVE EXAMPLE 1 | — | 96 |
| COMPARATIVE EXAMPLE 2 | 1.12 | 85 |
| COMPARATIVE EXAMPLE 3 | 1.12 | 84 |
| COMPARATIVE EXAMPLE 4 | 1.87 | 27 |
| COMPARATIVE EXAMPLE 5 | 1.87 | 28 |
| COMPARATIVE EXAMPLE 6 | 1.12 | 38 |
| COMPARATIVE EXAMPLE 7 | 1.12 | 27 |
| COMPARATIVE EXAMPLE 8 | 1.12 | 38 |
| COMPARATIVE EXAMPLE 9 | 1.12 | 73 |
| COMPARATIVE EXAMPLE 10 | 1.12 | 76 |
| COMPARATIVE EXAMPLE 11 | 1.12 | 16 |
| COMPARATIVE EXAMPLE 12 | 1.12 | 15 |

TABLE 9

FREEZING-THAWING TEST (TEST 1-3) RESULTS (2)

| | ADDED RATIO OF INVENTIVE PRODUCT AND COMPARISON PRODUCT (C × %) | DURABILITY INDEX |
|---|---|---|
| EXAMPLE 1 | 2.24 | 97 |
| EXAMPLE 2 | 3.20 | 83 |
| EXAMPLE 3 | 2.80 | 73 |
| EXAMPLE 4 | 3.56 | 83 |
| EXAMPLE 5 | 3.74 | 73 |
| EXAMPLE 6 | 2.80 | 82 |
| EXAMPLE 7 | 3.56 | 62 |
| EXAMPLE 8 | 3.75 | 89 |
| EXAMPLE 9 | 3.75 | 82 |
| EXAMPLE 10 | 3.75 | 60 |
| EXAMPLE 11 | 3.75 | 73 |
| EXAMPLE 12 | 3.75 | 82 |
| EXAMPLE 13 | 3.56 | 82 |
| EXAMPLE 14 | 3.56 | 63 |
| EXAMPLE 15 | 3.56 | 76 |
| EXAMPLE 16 | 3.56 | 80 |
| COMPARATIVE EXAMPLE 1 | — | 96 |
| COMPARATIVE EXAMPLE 2 | 2.24 | 82 |
| COMPARATIVE EXAMPLE 3 | 2.24 | 76 |
| COMPARATIVE EXAMPLE 4 | 3.75 | 4 |
| COMPARATIVE EXAMPLE 5 | 3.75 | 10 |
| COMPARATIVE EXAMPLE 6 | 2.24 | 23 |
| COMPARATIVE EXAMPLE 7 | 2.24 | 15 |
| COMPARATIVE EXAMPLE 8 | 2.24 | 17 |
| COMPARATIVE EXAMPLE 9 | 2.24 | 23 |
| COMPARATIVE EXAMPLE 10 | 2.24 | 35 |
| COMPARATIVE EXAMPLE 11 | 2.24 | 15 |
| COMPARATIVE EXAMPLE 12 | 2.24 | 2 |

The following can be seen from the results of Tests 1-1, 1-2, and 1-3. All of Examples 1 to 16, in which a hydrocarbon-based compound was added, exhibited better freezing-thawing resistance than Comparative Examples 1 to 12, which were existing products. Further, Examples 1 to 16 similarly exhibited a good shrinkage reducing effect. Among them, Examples 2 to 16, which also used a compound of the general formula (I), exhibited a remarkable effect. Further, from the results of the carbonation test, Examples 1 to 16, in which a hydrocarbon-based compound was added, exhibited a better substance blocking property than Comparative Examples 1 to 12. In addition, concerning the fluidity and softness of the concrete, there was no difference between the samples of Examples and the samples of Comparative Examples. Accordingly, it is clear that the durability improving agent for a cement composition of the present invention has excellent freezing-thawing resistance, as well as an excellent shrinkage reducing effect and an excellent substance blocking property, and thus is very useful as a durability improving agent for a cement composition.

Examples 17 to 19 and Comparative Examples 13 to 16

Table 10

Concrete compositions were prepared in the following manner, and subjected to concrete testing: a flesh concrete test, a drying shrinkage test, a carbonation test, and a freezing-thawing test.

The hydrocarbon-based compound used in Examples 17 to 19 and Comparative Examples 13 to 16 is hydrocarbon-based compound A (refer to Table 1).

Test 2-1 Flesh Concrete Test

Under the concrete preparation conditions shown in Table 11, used were ordinary Portland cement (density=3.15 g/cm$^3$), fine aggregate (land sand, density=2.58 g/cm$^3$), and coarse aggregate (crushed rock, density=2.69 g/cm$^3$). At each stage, 1 wt. % of an air entraining and high-range water reducing agent, standard type Flowric SF500S, manufactured by Flowric Co., Ltd., was added with respect to the cement weight. The target slump was set at 18±2.5 cm. Concerning air content, the target air content was set at 4.5±1.5%. To achieve the target air content, adjustment was carried out using AE-4 (the surfactant having a rosin acid potassium salt as a main component) manufactured by Flowric Co., Ltd. After the concrete was prepared, the durability improving agent (Examples) or comparison product (Comparative Examples) shown in Table 10 was mixed in the amounts shown in Table 12 and 13. The concrete was then mixed by the mixer to produce concrete compositions. Further, the composition ratio values for each component in Table 10 are all composition ratio values in terms of weight. In addition, W/C, s/a, W, C, S, and G in Table 11 represent the water cement ratio, the fine aggregate ratio, the unit water content, the unit cement content, the unit fine aggregate content, and the unit coarse aggregate content, respectively.

Tables 12 and 13 show the slump value (SL), the slump flow, the air content (Air), and C.T. (concrete mixing temperature). All of the these are values obtained by measuring under the same conditions as in Test 1-1.

Test 2-2 Drying Shrinkage Test and Carbonation Test

The drying shrinkage test was carried out as follows based on JIS A 1129:2001. Concrete compositions were prepared in the same manner as in the above Test 2-1. Each concrete composition was laid, and then a 10×10×40 cm test specimen was immediately produced. Twenty-four hours later, the molds were removed, and a marked line was drawn. Curing was carried out for 1 week in water at 20° C. Subsequently, the test specimens were stored in a constant temperature and humidity room at 20° C. and at 60% R.H., and the drying shrinkage ratio was measured. The drying shrinkage ratio results at drying material ages of 1 week, 4 weeks, 8 weeks, 13 weeks, and 26 weeks for each of Examples and Comparative Examples are shown in Tables 14 and 15. Further, Tables 14 and 15 also show the drying shrinkage ratios at a drying material age of 13 weeks for each of Examples and Comparative Examples with respect to Comparative Example 13. Similarly to Test 2-1, the carbonation test was carried out as follows based on JIS A 1153:2003. Each of the concrete compositions prepared in the above Test 2-1 was laid, and then a 10×10×40 cm test specimen was immediately produced. Twenty-four hours later, the molds were removed. Curing was carried out for 4 weeks in water at 20° C. Subsequently, the test specimens were stored in a room under accelerating constant temperature and humidity room of 20° C. and 60% R.H. for 4 weeks, and then stored in a constant temperature and humidity room at 20° C. and at 60% R.H. with a carbon dioxide gas concentration increased to 5%. Substance blocking performance was evaluated by measuring the carbonated depth. The carbonated depth at an accelerated material age of week 13 for Examples and Comparative Examples is shown in Tables 14 and 15.

Test 2-3 Freezing-Thawing Test

The freezing-thawing test was carried out as follows based on JIS A 1148:2001 (method A). Concrete compositions were prepared in the same manner as in the above Test 2-1. Each concrete composition was laid, and then a 10×10×40 cm test specimen was immediately produced. Twenty-four hours later, the molds were removed. Curing was carried out for 4 weeks in water at 20° C. A durability index was determined by carrying out a freezing-thawing test at 300 cycles (c). The durability index for each of Examples and Comparative Examples is shown in Tables 16 and 17. Generally, it is said that freezing-thawing resistance is good if the durability index of a concrete composition is 60% or more.

The following can be seen from Tests 2-1, 2-2, and 2-3. In Tests 2-1, 2-2, and 2-3, the base concrete blend is designed so that freezing-thawing resistance is poor. Compared with Comparative Example 13, Examples 17 to 19 exhibit a remarkable freezing-thawing resistance. Accordingly, it can be seen that the durability improving agent for a cement composition of the present invention impart an effect of improving freezing-thawing resistance to a conventional concrete, in which the freezing-thawing resistance is originally poor. Further, compared with Comparative Examples 14 to 16, Examples 17 to 19 not only have better freezing-thawing resistance, but also have an equivalent shrinkage reducing effect and an equivalent substance blocking property. Therefore, it can be seen that not only does the composition of the present invention have very good freezing-thawing resistance, but also has a very good shrinkage reducing effect and a very good substance blocking property.

TABLE 10

EXAMPLE COMPOSITION

COMPOSITION SUMMARY

| | HYDROCARBON-BASED COMPOUND | | COMPOUND OF THE GENERAL FORMULA (I) | | OTHER COMPONENT | | WATER |
|---|---|---|---|---|---|---|---|
| | COMPOUND | RATIO OF COMPOSITION IN PREPARATION | COMPOUND | RATIO OF COMPOSITION IN PREPARATION | COMPOUND | RATIO OF COMPOSITION IN PREPARATION | RATIO OF COMPOSITION IN PREPARATION |
| EXAMPLE 17 | HYDROCARBON-BASED COMPOUND A | 100.00 | — | — | — | — | — |
| EXAMPLE 18 | HYDROCARBON-BASED COMPOUND A | 97.90 | — | — | POLYOXYETHYLENE HYDROGENATED CASTOR OIL | 2.10 | — |
| EXAMPLE 19 | HYDROCARBON-BASED COMPOUND A | 29.37 | DIETHYLENE GLYCOL MONOBUTYL ETHER | 68.53 | POLYOXYETHYLENE HYDROGENATED CASTOR OIL | 2.10 | — |
| COMPARATIVE EXAMPLE 13 | — | — | — | — | — | — | — |
| COMPARATIVE EXAMPLE 14 | COMERCIALLY-AVAILABLE PRODUCT A (POLYPROPYLENE GLYCOL) | | 100.00 | | — | — | — |
| COMPARATIVE EXAMPLE 15 | COMERCIALLY-AVAILABLE PRODUCT B (A POLYALKYLENE GLYCOL-BASED COMPOUND) | | 100.00 | | — | — | — |
| COMPARATIVE EXAMPLE 16 | COMERCIALLY-AVAILABLE PRODUCT C (A POLYOXYALKYLENE ALKYL ETHER COMPOUND) | | 100.00 | | — | — | — |

TABLE 11

| CONCRETE PREPARATION | | | | | | | |
|---|---|---|---|---|---|---|---|
| | | | UNIT CONTENT (kg/m³) | | | DESIGN AIR CONTENT | ADDED RATIO OF INVENTIVE PRODUCT AND COMPARISON |
| TYPE | W/C | s/a | W | C | S | G | (%) | PRODUCT (C × %) |
| BASE CONCRETE | 0.44 | 0.45 | 170 | 386 | 776 | 982 | 4.5 | — |
| INVENTIVE PRODUCT AND COMPARISON PRODUCT CONCRETE | | | | | | | | 1.0 to 2.1 |

TABLE 12

FRESH CONCRETE TEST (TEST 2-1) RESULTS (1)

| | ADDED RATIO OF INVENTIVE PRODUCT AND COMPARISON PRODUCT (C × %) | TEST RESULTS | | | |
|---|---|---|---|---|---|
| | | SLUMP (cm) | SLUMP FLOW (mm) | AIR CONTENT (%) | C.T. (° C.) |
| EXAMPLE 17 | 1.00 | 19.0 | 325 | 5.0 | 21.0 |
| EXAMPLE 18 | 1.00 | 19.5 | 330 | 5.3 | 21.0 |
| EXAMPLE 19 | 1.00 | 19.5 | 330 | 5.2 | 21.0 |
| COMPARATIVE EXAMPLE 13 | — | 18.5 | 305 | 5.7 | 21.0 |
| COMPARATIVE EXAMPLE 14 | 1.00 | 19.5 | 320 | 5.2 | 21.0 |
| COMPARATIVE EXAMPLE 15 | 1.00 | 19.5 | 315 | 5.8 | 21.0 |
| COMPARATIVE EXAMPLE 16 | 1.00 | 19.5 | 325 | 5.1 | 21.0 |

TABLE 13

FRESH CONCRETE TEST (TEST 2-1) RESULTS (2)

| | ADDED RATIO OF INVENTIVE PRODUCT AND COMPARISON PRODUCT (C × %) | TEST RESULTS | | | |
|---|---|---|---|---|---|
| | | SLUMP (cm) | SLUMP FLOW (mm) | AIR CONTENT (%) | C.T. (° C.) |
| EXAMPLE 17 | 2.10 | 19.5 | 330 | 5.5 | 21.0 |
| EXAMPLE 18 | 2.10 | 20.0 | 340 | 5.4 | 21.0 |
| EXAMPLE 19 | 2.10 | 20.5 | 340 | 5.2 | 21.0 |
| COMPARATIVE EXAMPLE 13 | — | 18.5 | 305 | 5.7 | 21.0 |
| COMPARATIVE EXAMPLE 14 | 2.10 | 20.0 | 340 | 5.2 | 21.0 |
| COMPARATIVE EXAMPLE 15 | 2.10 | 20.5 | 345 | 5.8 | 21.0 |
| COMPARATIVE EXAMPLE 16 | 2.10 | 20.0 | 340 | 5.1 | 21.0 |

TABLE 14

DRYING SHRINKAGE AND CARBONATION TEST (TEST 2-2) RESULTS (1)

| | ADDED RATIO OF INVENTIVE PRODUCT AND COMPARISON PRODUCT (C × %) | DRYING SHRINKAGE RATIO (×10⁻⁴) DRYING PERIOD | | | | | DRYING SHRINKAGE RATIO WITH RESPECT TO COMPARATIVE EXAMPLE 13 (%) DRYING PERIOD | | | | | CARBONATION DEPTH (mm) ACCELERATED PERIOD |
|---|---|---|---|---|---|---|---|---|---|---|---|---|
| | | 1 WEEK | 4 WEEK | 8 WEEK | 13 WEEK | 26 WEEK | 1 WEEK | 4 WEEK | 8 WEEK | 13 WEEK | 26 WEEK | 13 WEEK |
| EXAMPLE 17 | 1.00 | 1.42 | 2.52 | 3.64 | 4.20 | 4.98 | 76 | 73 | 82 | 85 | 94 | 0.03 |
| EXAMPLE 18 | 1.00 | 4.32 | 2.36 | 3.26 | 3.91 | 4.42 | 70 | 68 | 73 | 79 | 83 | 0.04 |
| EXAMPLE 19 | 1.00 | 1.13 | 2.03 | 2.84 | 3.51 | 4.00 | 60 | 59 | 64 | 71 | 75 | 0.03 |

TABLE 14-continued

DRYING SHRINKAGE AND CARBONATION TEST (TEST 2-2) RESULTS (1)

| | ADDED RATIO OF INVENTIVE PRODUCT AND COMPARISON PRODUCT (C × %) | DRYING SHRINKAGE RATIO (×10$^{-4}$) DRYING PERIOD | | | | | DRYING SHRINKAGE RATIO WITH RESPECT TO COMPARATIVE EXAMPLE 13 (%) DRYING PERIOD | | | | | CARBONATION DEPTH (mm) ACCELERATED PERIOD |
|---|---|---|---|---|---|---|---|---|---|---|---|---|
| | | 1 WEEK | 4 WEEK | 8 WEEK | 13 WEEK | 26 WEEK | 1 WEEK | 4 WEEK | 8 WEEK | 13 WEEK | 26 WEEK | 13 WEEK |
| COMPARATIVE EXAMPLE 13 | — | 1.88 | 3.45 | 4.45 | 4.92 | 5.32 | 100 | 100 | 100 | 100 | 100 | 0.10 |
| COMPARATIVE EXAMPLE 14 | 1.00 | 1.43 | 2.68 | 3.56 | 4.01 | 4.81 | 76 | 78 | 80 | 82 | 90 | 0.85 |
| COMPARATIVE EXAMPLE 15 | 1.00 | 1.35 | 2.51 | 3.08 | 3.94 | 4.50 | 72 | 73 | 69 | 80 | 85 | 0.98 |
| COMPARATIVE EXAMPLE 16 | 1.00 | 1.42 | 2.59 | 3.38 | 3.99 | 4.72 | 76 | 75 | 76 | 81 | 89 | 0.92 |

TABLE 15

DRYING SHRINKAGE AND CARBONATION TEST (TEST 2-2) RESULTS (2)

| | ADDED RATIO OF INVENTIVE PRODUCT AND COMPARISON PRODUCT (C × %) | DRYING SHRINKAGE RATIO (×10$^{-4}$) DRYING PERIOD | | | | | DRYING SHRINKAGE RATIO WITH RESPECT TO COMPARATIVE EXAMPLE 13 (%) DRYING PERIOD | | | | | CARBONATION DEPTH (mm) ACCELERATED PERIOD |
|---|---|---|---|---|---|---|---|---|---|---|---|---|
| | | 1 WEEK | 4 WEEK | 8 WEEK | 13 WEEK | 26 WEEK | 1 WEEK | 4 WEEK | 8 WEEK | 13 WEEK | 26 WEEK | 13 WEEK |
| EXAMPLE 17 | 2.10 | 1.35 | 2.45 | 3.50 | 4.10 | 4.89 | 72 | 71 | 79 | 83 | 92 | 0.08 |
| EXAMPLE 18 | 2.10 | 1.25 | 2.26 | 3.18 | 3.73 | 4.36 | 66 | 66 | 71 | 76 | 82 | 0.07 |
| EXAMPLE 19 | 2.10 | 1.03 | 1.84 | 2.54 | 3.15 | 3.85 | 55 | 53 | 57 | 64 | 72 | 0.09 |
| COMPARATIVE EXAMPLE 13 | — | 1.88 | 3.45 | 4.45 | 4.92 | 5.32 | 100 | 100 | 100 | 100 | 100 | 0.10 |
| COMPARATIVE EXAMPLE 14 | 2.10 | 1.32 | 2.48 | 3.31 | 3.89 | 4.41 | 70 | 72 | 74 | 79 | 83 | 1.80 |
| COMPARATIVE EXAMPLE 15 | 2.10 | 1.23 | 2.45 | 3.22 | 3.84 | 4.35 | 65 | 71 | 72 | 78 | 82 | 1.60 |
| COMPARATIVE EXAMPLE 16 | 2.10 | 1.25 | 2.43 | 3.18 | 3.78 | 4.29 | 66 | 70 | 71 | 77 | 81 | 1.72 |

TABLE 16

FREEZING-THAWING TEST (TEST 2-3) RESULTS (1)

| | ADDED RATIO OF INVENTIVE PRODUCT AND COMPARISON PRODUCT (C × %) | DURABILITY INDEX |
|---|---|---|
| EXAMPLE 17 | 1.00 | 94 |
| EXAMPLE 18 | 1.00 | 92 |
| EXAMPLE 19 | 1.00 | 90 |
| COMPARATIVE EXAMPLE 13 | — | 22 |
| COMPARATIVE EXAMPLE 14 | 1.00 | 16 |
| COMPARATIVE EXAMPLE 15 | 1.00 | 13 |
| COMPARATIVE EXAMPLE 16 | 1.00 | 16 |

TABLE 17

FREEZING-THAWING TEST (TEST 2-3) RESULTS (2)

| | ADDED RATIO OF INVENTIVE PRODUCT AND COMPARISON PRODUCT (C × %) | DURABILITY INDEX |
|---|---|---|
| EXAMPLE 17 | 2.10 | 91 |
| EXAMPLE 18 | 2.10 | 92 |
| EXAMPLE 19 | 2.10 | 68 |
| COMPARATIVE EXAMPLE 13 | — | 22 |
| COMPARATIVE EXAMPLE 14 | 2.10 | 13 |
| COMPARATIVE EXAMPLE 15 | 2.10 | 8 |
| COMPARATIVE EXAMPLE 16 | 2.10 | 10 |

Based on the above-described results of Examples, it is clear that, the durability improving agent for a cement composition of the present invention has a remarkable effect in improving freezing-thawing resistance, and can confer both a shrinkage reducing effect and a substance blocking property for a wide variety of compositions including concrete, cement and the like regardless of the kind of target cement composition. Therefore it is clear that the durability improving agent for a cement composition of the present invention has a very useful as a cement composition additive for a cement composition.

The invention claimed is:

1. A durability improving agent, comprising a hydrocarbon-comprising compound having an average molecular weight of 150 to 600, a pour point of 20° C. or less as an active ingredient, and a kinematic viscosity at 40° C. of 50 mm²/S or less, wherein the durability improving agent is suitable for a cement composition.

2. The durability improving agent of claim 1, further comprising a compound of formula (I):

$$R\text{—}O\text{-}(AO)_n\text{—}H \qquad (I),$$

wherein
R represents hydrogen or a hydrocarbon group having 1 to 8 carbon atoms,
AO represents an oxyalkylene group having 2 to 4 carbon atoms, and
n denotes an integer of 1 or more to 20 or less, and
wherein a ratio of the hydrocarbon-comprising compound to the compound of formula (I) is 5/95 to 99/1 by weight.

3. A cement composition, comprising the durability improving agent of claim 1.

4. The cement composition of claim 3, wherein the durability improving agent for a cement composition has a content, based on a composition weight ratio of the cement composition, of 0.02 wt. % to 2 wt. %.

5. A cement composition, comprising the durability improving agent of claim 2.

6. The cement composition of claim 5, wherein the durability improving agent for a cement composition has a content, based on a composition weight ratio of the cement composition, of 0.02 wt. % to 2 wt. %.

7. A method for improving durability of a cement composition, comprising:
adding a hydrocarbon-comprising compound to the cement composition,
wherein the hydrocarbon-comprising compound has an average molecular weight of 150 to 600, a pour point of 20° C. or less as an active ingredient and a kinematic viscosity at 40° C. of 50 mm²/S or less.

8. The durability improving agent of claim 1, wherein the hydrocarbon-comprising compound has a kinematic viscosity at 40° C. in a range of 1 mm²/S or more to 50 mm²/S or less.

9. The durability improving agent of claim 1, wherein the hydrocarbon-comprising compound has a kinematic viscosity at 40° C. in a range of 1 mm²/S or more to 20 mm²/S or less.

10. The durability improving agent of claim 1, wherein the hydrocarbon-comprising compound has a kinematic viscosity at 40° C. in a range of 3 mm²/S or more to 50 mm²/S or less.

11. The durability improving agent of claim 1, wherein the hydrocarbon-comprising compound has a kinematic viscosity at 40° C. in a range of 3 mm²/S or more to 20 mm²/S or less.

12. The durability improving agent of claim 2, wherein the hydrocarbon-comprising compound has a kinematic viscosity at 40° C. in a range of 1 mm²/S or more to 50 mm²/S or less.

13. The durability improving agent of claim 2, wherein the hydrocarbon-comprising compound has a kinematic viscosity at 40° C. in a range of 1 mm²/S or more to 20 mm²/S or less.

14. The durability improving agent of claim 2, wherein the hydrocarbon-comprising compound has a kinematic viscosity at 40° C. in a range of 3 mm²/S or more to 50 mm²/S or less.

15. The durability improving agent of claim 2, wherein the hydrocarbon-comprising compound has a kinematic viscosity at 40° C. in a range of 3 mm²/S or more to 20 mm²/S or less.

16. The durability improving agent of claim 1, wherein the pour point of the hydrocarbon-comprising compound is 0° C. or less.

17. The durability improving agent of claim 1, wherein the pour point of the hydrocarbon-comprising compound is −10° C. or less.

18. The durability improving agent of claim 1, wherein the average molecular weight of the hydrocarbon-comprising compound is 200 to 400.

19. The durability improving agent of claim 1, wherein the average molecular weight of the hydrocarbon-comprising compound is 250 to 350.

20. The durability improving agent of claim 1, wherein a content of the hydrocarbon-comprising compound in the durability improving agent is 10 to 80 wt. %.

* * * * *